United States Patent
Takizawa et al.

(10) Patent No.: US 7,088,407 B2
(45) Date of Patent: Aug. 8, 2006

(54) COLOR FILTER SUBSTRATE, METHOD OF MANUFACTURING COLOR FILTER SUBSTRATE, ELECTRO-OPTICAL DEVICE, METHOD OF MANUFACTURING ELECTRO-OPTICAL DEVICE, AND ELECTRONIC APPARATUS

(75) Inventors: Keiji Takizawa, Hotaka-machi (JP); Toshinori Uehara, Motsuinoto (JP); Tomoyuki Nakano, Toyoshina-machi (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 10/732,899

(22) Filed: Dec. 10, 2003

(65) Prior Publication Data

US 2004/0160552 A1    Aug. 19, 2004

(30) Foreign Application Priority Data

Dec. 10, 2002    (JP)    ............................. 2002-358381

(51) Int. Cl.
  *G02F 1/1333*    (2006.01)
  *G02F 1/1335*    (2006.01)

(52) U.S. Cl. ...................... 349/114; 349/138; 349/107; 349/106

(58) Field of Classification Search ................ 349/107, 349/114, 158
See application file for complete search history.

(56) References Cited

U.S. PATENT DOCUMENTS

| | | | |
|---|---|---|---|
| 4,632,514 A * | 12/1986 | Ogawa et al. .............. | 349/160 |
| 5,040,875 A | 8/1991 | Noguchi | |
| 5,085,973 A * | 2/1992 | Shimizu et al. ........... | 430/271.1 |
| 6,271,902 B1 * | 8/2001 | Ogura et al. ................ | 349/106 |
| 6,476,889 B1 | 11/2002 | Urabe et al. | |
| 6,501,521 B1 * | 12/2002 | Matsushita et al. ......... | 349/106 |
| 6,757,038 B1 * | 6/2004 | Itoh et al. ................... | 349/113 |
| 6,785,068 B1 * | 8/2004 | Takizawa et al. ........... | 359/885 |
| 6,847,426 B1 * | 1/2005 | Fujimori et al. ............ | 349/113 |
| 6,850,298 B1 * | 2/2005 | Fujimori et al. ............ | 349/114 |
| 6,906,765 B1 * | 6/2005 | Narutaki et al. ............ | 349/106 |
| 2002/0063824 A1 | 5/2002 | Ha et al. | |
| 2002/0113927 A1 | 8/2002 | Ha et al. | |

FOREIGN PATENT DOCUMENTS

EP    1 109 053    12/2000

(Continued)

OTHER PUBLICATIONS

Communication from European Patent Office re: counterpart application.

(Continued)

*Primary Examiner*—Andrew Schechter
*Assistant Examiner*—Mike Qi
(74) *Attorney, Agent, or Firm*—Harness, Dickey & Pierce, P.L.C.

(57) ABSTRACT

A color filter substrate is provided that includes a first colored layer disposed in a first region Ls and a second colored layer disposed in a second region Hs, the first colored layer and the second colored layer are disposed adjacent to each other and a surface of the second region is configured to be higher than that of the first region, and moreover, a step difference plane is provided between the first region and the second region and an interface portion between the first colored layer and the second colored layer is disposed in a region toward the second region from the bottom portion of the step difference plane.

15 Claims, 9 Drawing Sheets

FOREIGN PATENT DOCUMENTS

| | | |
|---|---|---|
| JP | 60-159830 | 8/1985 |
| JP | 60-202423 | 10/1985 |
| JP | 63-082405 | 4/1988 |
| JP | 2000-267081 | 9/2000 |
| JP | 2001-125094 | 5/2001 |
| JP | 2001-166289 | 6/2001 |
| JP | 2002-122859 | 4/2002 |
| JP | 2002-287131 | 10/2002 |
| KR | 2002-33844 | 5/2002 |

OTHER PUBLICATIONS

Communication from Chinese Patent Office regarding related application.

Communication from Korean Patent Office regarding related application.

Communication from Japanese Patent Office re: related application.

* cited by examiner

COLOR FILTER SUBSTRATE, METHOD OF MANUFACTURING COLOR FILTER SUBSTRATE, ELECTRO-OPTICAL DEVICE, METHOD OF MANUFACTURING ELECTRO-OPTICAL DEVICE, AND ELECTRONIC APPARATUS

BACKGROUND OF THE INVENTION

1. Technical Field of the Invention

The present invention relates to a color filter substrate, a method of manufacturing a color filter substrate, an electro-optical device, a method of manufacturing an electro-optical device, and an electronic apparatus, and more specifically, the present invention relates to a technique adapted for a liquid crystal display having a structure in which the thickness of the liquid crystal layers is different from each other in the two areas of a single pixel.

2. Description of the Related Art

Generally, liquid crystal displays have been used as display means in electronic apparatuses such as cellular phones, portable information terminals such as PDAs, personal computers, etc. Recently, PDPs (plasma display panels) have also been used in television devices, etc., and moreover, organic electroluminescent devices have been recently used in some apparatuses. Various types of such electro-optical devices using the electro-optical effect of different electro-optical materials are expected to be used in more and more fields in the future.

A transmissive liquid crystal panel which is provided with an illuminator such as a backlight at the rear thereof and enables viewing of a display by making use of the light of this illuminator has been used because a conventional liquid crystal display has no self-luminescent performance. In case of using an illuminator, however, since it is difficult to reduce power consumption and especially it has an effect on the life span of a battery for portable apparatuses, a reflective liquid crystal panel, which does not require an illuminator, has been widely used.

Meanwhile, as the precision of a display becomes higher and higher or a display becomes more colorful, a situation has occurred that the brightness of a display lacks in a reflective liquid crystal panel, so that a transflective liquid crystal panel has been developed, which can provide a reflective display while using a backlight. It has been known that as this transflective liquid crystal panel, each pixel disposed in the display region comprises a light transmission portion configured to enable light to be transmitted and a light reflection portion configured to enable light to be reflected by disposing a light reflection layer, wherein the light transmission portion is usually configured by providing an opening in the light reflection.

However, a problem occurs wherein if a color filter is provided in the transflective liquid crystal panel to enable colors to be displayed, it is difficult to control the color adjustment between the transmissive display using the light transmission portion within each pixel and the reflective display using the light reflection portion within each pixel. Such problems occur because light passing through the colored layer of a color filter passes only once in the transmissive display since the light irradiated from a backlight is transmitted through a liquid crystal panel and is emitted toward an observing side; however, light passing through the colored layer of a color filter passes twice in the reflective display since the external light incident from an observing side is reflected by a light reflection layer and emitted toward the observing side. That is, if hue or brightness of a colored layer of a color filter is adjusted to favor the transmissive display, chromaticness can be attained but a display becomes dark in a reflective display, and on the contrary, if hue or brightness of a colored layer of a color filter is adjusted to favor the reflective display, the chromaticness required in a transmissive display cannot be attained.

Meanwhile, as illustrated in FIG. 5($a$) to 5($c$) of the document, the difference between the transmissive display and the reflective display in a color display condition is reduced by forming an opening of a light reflection film corresponding to the largest film thickness portion of a colored pixel.

However, in the above-mentioned method, it is difficult to sufficiently control display colors of a transmissive display and a reflective display since it is difficult to sufficiently obtain the difference in the film thickness of a colored layer between a portion used in a transmissive display and a portion used in a reflective display. On this account, as illustrated in FIG. 10, a liquid crystal display 100 has been devised wherein two types of colored layers are arranged in every pixel, a colored layer 114C of a dark color with a thick optical film thickness is arranged to overlap an opening 113$a$ of a light reflection layer 113, and a colored layer 114F of a light color with a thin optical film thickness is arranged to overlap a light reflection layer 113.

In the liquid crystal display 100, on one side of a substrate 110, a transparent base layer 112 is formed on a base member 111, and a light reflection layer 113 made of aluminum is formed on the base layer 112. An opening 113$a$ is provided in the light reflection layer 113, as described above. A color filter is configured such that a colored layer 114C is disposed on the corresponding opening 113$a$ and a colored layer 114F is disposed on the light reflection layer 113. Also, a light shielding portion 114B is for preventing a light leak of a region between pixels. A transparent protective film 115 is formed on a color filter, and a transparent electrode 116 made of ITO (indium tin oxide), etc. is formed on the protective film 115. An alignment film 117 is formed on the transparent electrode 116. Also, on the other side of the substrate 120, a transparent electrode 122 similar to the above transparent electrode is formed on a base member 121 and an alignment film 123 is formed on the transparent electrode 122.

By the above-mentioned configuration, in a light transmission portion Pt performing a transmissive display and a light reflection portion Pr performing a reflective display within a pixel P, the color design is implemented separately thereby making it possible to improve a display quality in both displays and to reduce the difference between both displays in the aspect of a color display.

Moreover, in the above-mentioned liquid crystal display 100, in order to reduce the difference in a substantial retardation value of a liquid crystal layer LC between a transmissive display and a reflective display, and to improve the balance of both displays to elevate the display quality, a liquid crystal layer LC is configured to be made thick in a light transmission portion Pt where an opening 113$a$ is provided and a liquid crystal layer LC is configured to be made thin in a light reflection portion Pr where a light reflection layer 113 is disposed within a pixel P. Specifically, by forming the above-mentioned protective film 115 only in the region other than a light transmission portion Pt, i.e., only the region including a light reflection portion Pr, a surface of the substrate 110 is configured to be low in a light transmission portion Pt and is configured to be high in a light reflection portion Pr.

Meanwhile, in the above-mentioned liquid crystal display 100, within a single pixel P, it is necessary to dispose a colored layer 114C and a colored layer 114F adjacent to each other, and a colored layer 114C and a colored layer 114F are formed to overlap each other so as not to have a gap at an interface portion between both colored layers. In this case, a problem occurs wherein a display quality is deteriorated in the vicinity of the corresponding surface and especially the display quality of a transmissive display is deteriorated, since a protrusion 114E is formed on the surface of a color filter due to overlapping of both colored layers, and a protrusion or a recessed portion is formed in the vicinity of the surface of a substrate 110 in contact with a liquid crystal layer LC due to the protrusion 114E. Also, a problem occurs wherein since a partial tear or omission tends to occur in a transparent electrode 116 on the interface portion due to surface unevenness by the above-mentioned protrusion 114E, the state of electric field application changes in a light transmission portion Pt, which also deteriorates the display quality of a transmissive display.

Therefore, the present invention is directed to overcoming these problems, and an object of the present invention is to provide technical means in a color filter substrate or an electro-optical device for preventing optical and electrical defects in the interface portion where different colored layers are adjacent to each other, and for preventing the occurrence of bad quality.

SUMMARY

In order to solve the above problems, the present invention is characterized in that a color filter substrate comprises a substrate, a first colored layer disposed on a first region of the substrate, and a second colored layer disposed on a second region of the substrate, wherein the first colored layer and the second colored layer are disposed adjacent to each other so that a surface of the second region is configured to be higher than that of the first region, and a step difference is provided between the first region and the second region so that an interface portion between the first colored layer and the second colored layer is disposed in a region toward the second region from the bottom portion of the step difference.

According to the present invention, the interface portion between the first colored layer and the second colored layer is disposed in a region toward the second region from the bottom portion of the step difference plane between the first region having a lower surface and the second region having a higher surface. So that, even though a protrusion is attempted to be formed in the interface portion between the first colored layer and the second colored layer due to overlapping of the first colored layer and the second colored layer or a gap is attempted to be formed between the first colored layer and the second colored layer, it is difficult for a minute uneven structure to be formed because the protrusion and gap are absorbed into the step difference between the first region and the second region, or the higher surface of the second region, which is formed on the corresponding protrusion or the gap. Therefore, it is possible to reduce the occurrence of the optical and electrical defects based on the uneven structure.

Further, in the present invention, as will be described later, in a case where at least a portion of the interface portion is disposed to overlap the step difference plane; there is an occasion when the interface portion is disposed within the second region without overlapping the step difference plane.

In the present invention, preferably, a protrusion caused by overlapping the first colored layer and the second colored layer is provided on the surface of the interface portion, and the protrusion is disposed in a region toward the second region from the bottom portion of the step difference plane.

In the present invention, preferably, the step difference plane is inclined and at least a portion of the interface portion is disposed in a region overlapping the step difference plane in plan view. If the step difference plane is inclined, it is possible to improve the covering performance of a layer to be formed thereon such as various kinds of electrodes like a transparent electrode or a reflective electrode, or a wire, and to reduce a structural effect on an upper layer structure. Also, since the step difference plane is inclined such that it is possible to expand a region overlapping the step difference plane (step difference region in plan view, which will be described later), it is possible to dispose the interface portion within the corresponding region and to reduce a structural effect caused by the interface portion on an upper layer structure. Further, since at least a portion of the interface portion is disposed on the corresponding region and the first colored layer is formed almost corresponding to the first region and the second colored layer is formed almost corresponding to the second region, it is possible to match the optical design of the first colored layer and the second colored layer with the step difference structure formed by the first region and the second region. Moreover, since both the step difference plane and the interface portion have an effect on optical characteristics of a color filter substrate but both of them are provided in the same place, it is, on the whole, possible to reduce the optical effect (e.g., a light leak in a light shielding state) rendered by the step difference plane and the interface portion. At this time, the entire interface portion is most preferably disposed within a region overlapping the step difference plane.

In the present invention, preferably, a light transmission portion configured to make it possible to substantially transmit light is provided in the first region and a light reflection portion where a light reflection layer is disposed is provided in the second region. As such, it is possible to configure a color filter substrate with both a light transmission and a light reflection capabilities and to set a prescribed step difference between the light transmission portion and the light reflection portion.

In the present invention, the light reflection portion preferably includes the interface portion. When the interface portion is disposed within the light transmission portion, both the step difference plane and the interface portion have optical effect on a transmitted light component of the color filter substrate, but when the interface portion is disposed within the light reflection portion, it is possible to remove all the optical effect of the step difference plane and the interface portion on the transmitted light component. At this time, since the reflected light component which is reflected by the color filter substrate is mainly the light reflected by the light reflection layer in the light reflection portion, but includes a light component reflected by the first colored layer of the light transmission portion, the effect of the step difference plane or the interface portion on the reflected light component is presumed to be relatively small compared with the transmitted light component that is only affected by the substantial optical effect of the light transmission portion.

In the present invention, preferably, an electrode is integrally formed on a surface extending from the first region via the step difference plane to the second region. When the integral electrode is provided on a surface extending from the first region via the step difference plane to the second region, it is possible to improve a covering performance of the electrode and to prevent the applied state of the electric field from getting worse due to the fact that the film thickness in the electrode becomes partly thin or a tear occurs, since the interface portion is disposed in a region toward the second region from the bottom portion of the step difference plane so that it is difficult for a minute uneven structure to be formed except for the step difference structure by the step difference plane.

Next, the present invention is characterized in that a method of manufacturing a color filter substrate comprises a first coloring step where a first colored layer is disposed on a first region; a second coloring step where a second colored layer is disposed on a second region; and a step difference forming step where a surface of the second region is formed to be higher than that of the first region via a step difference plane between the first region and the second region; wherein, in the step difference forming step, the bottom portion of the step difference plane is formed in a region toward the first colored layer from an interface portion between the first colored layer and the second colored layer.

According to the present invention, the bottom portion of the step difference plane between the first region having a lower surface and the second region having a higher surface is disposed in a region toward the first region from the interface portion between the first colored layer and the second colored layer. So that, even though a protrusion is attempted to be formed or a gap is attempted to be formed in the interface portion between the first colored layer and the second colored layer due to overlapping the first colored layer and the second colored layer, it is difficult for a minute uneven structure to be formed due to the above-mentioned protrusion or the gap, since the step difference between the first region and the second region or the second region having a higher surface is formed on the protrusion or the gap. Therefore, it is possible to reduce the occurrence of the optical and electrical defects based on the corresponding uneven structure. Further, in the present invention, as will be described later, in a case where at least a portion of the interface portion is disposed to overlap the step difference plane, and such case includes an occasion when the interface portion being disposed within the second region without overlapping the step difference plane.

In the present invention, the first colored layer is preferably formed to overlap the second colored layer on the interface portion in the above-mentioned first and second coloring steps. The first colored layer and the second colored layer are formed to overlap each other thereby making it possible to prevent a gap from occurring between both colored layers and to thus prevent the light from leaking in the color filter.

In the present invention, in the step difference forming step, the step difference plane is preferably formed as the inclined plane in a region overlapping at least a portion of the interface portion in plan view. In this case, the step difference plane is formed as an inclined plane thereby making it possible to improve a covering performance of the layer to be formed thereon (e.g., an electrode or a wire). Also, since it is possible to expand a region overlapping the step difference plane by inclining the step difference plane, it is possible to dispose the interface portion within the region and thus to reduce a structural effect caused by the interface portion on the upper layer. Moreover, since the step difference plane and the interface portion which tend to have an optical effect are arranged on the same position by providing the step difference plane in the region overlapping at least a portion of the interface portion in plan view, it is, on the whole, possible to reduce the optical effect of the step difference plane and the interface portion.

The present invention preferably further comprises a step for forming a light reflection layer having an opening in the first region and the light reflection layer is formed to cover the interface portion.

When the interface portion is disposed within the opening, both the step difference plane and the interface portion have an optical effect on a transmitted light component of the color filter substrate, but when the interface portion is covered with the light reflection layer, it is possible to remove the above-mentioned optical effect on the transmitted light component.

Next, the present invention is characterized in that the electro-optical device comprises an electro-optical material, electric field applying means for applying an electric field to the electro-optical material, and any one of the color filter substrates as described above.

According to the present invention, it is possible to improve the display quality of both the transmissive display and the reflective display since it is possible to display in color by making use of a color filter substrate, and moreover, to configure the electro-optical device where the first region differs from the second region in the electro-optical material thickness.

In the present invention, preferably, the electro-optical material is a liquid crystal and the liquid crystal layer in the first region is configured to be thicker than the liquid crystal layer in the second region, corresponding to the height difference between the first region and the second region in the color filter substrate. As such, it is possible to make both a transmissive display by the transmitted light component irradiated from illumination means and a reflective display by the reflected light component of an external light incident from an observing side bright, resulting in improved display quality.

Next, the present invention is characterized in that a method of manufacturing an electro-optical device comprises a first coloring step where a first colored layer is disposed on a first region on the substrate to be disposed along the electro-optical material; a second coloring step where a second colored layer is disposed on a second region on the substrate to be disposed along the electro-optical material; a step difference forming step where a surface of the second region is formed to be higher than that of the first region via a step difference plane between the first region and the second region; wherein, in the step difference forming step, the bottom portion of the step difference plane is formed in a region toward the first colored layer from a interface portion between the first colored layer and the second colored layer.

In the present invention, the first colored layer and the second colored layer are preferably formed to overlap each other on the interface portion in the above-mentioned first and second coloring steps.

In the present invention, the step difference plane is preferably formed as an inclined plane in a region overlapping at least a portion of the interface portion in plan view, in the step difference forming step.

The present invention preferably further comprises a step for forming a light reflection layer having an opening in the first region and the corresponding light reflection layer is formed to cover the interface portion.

The present invention is characterized in that an electronic apparatus comprises any one of the electro-optical devices as described above and control means for controlling the electric field applying means of the electro-optical device.

DETAILED DESCRIPTION

Reference will now be made in detail to the preferred embodiments of a color filter substrate, a method of manufacturing a color filter substrate, an electro-optical device, a method of manufacturing an electro-optical device, and an electronic apparatus according to the present invention in conjunction with the accompanying drawings.

A Color Filter Substrate and an Electro-optical Device

Figure 1:
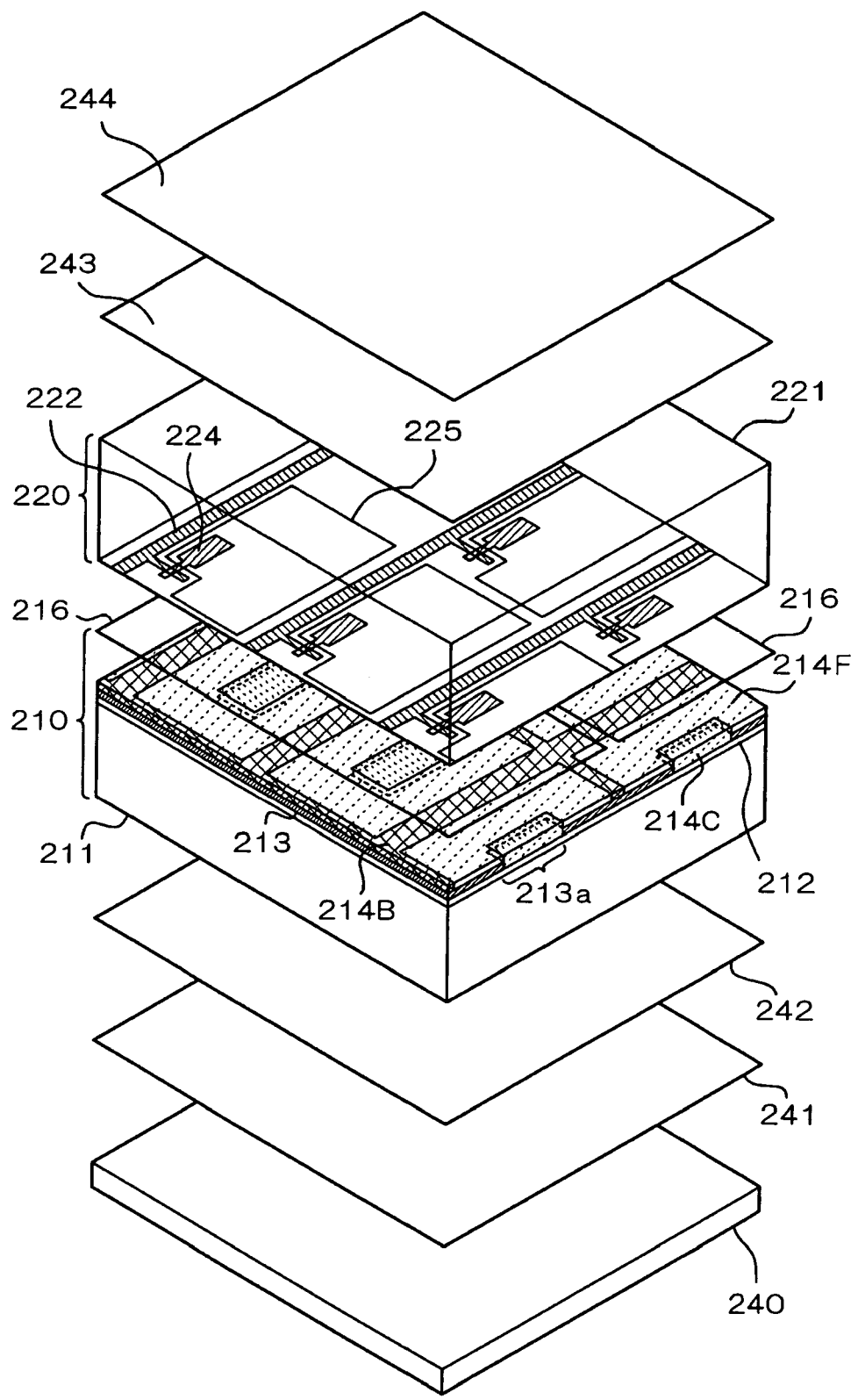
FIG. 1 is an exploded perspective view showing a structure of an electro-optical device according to the present invention.
Figure 2:
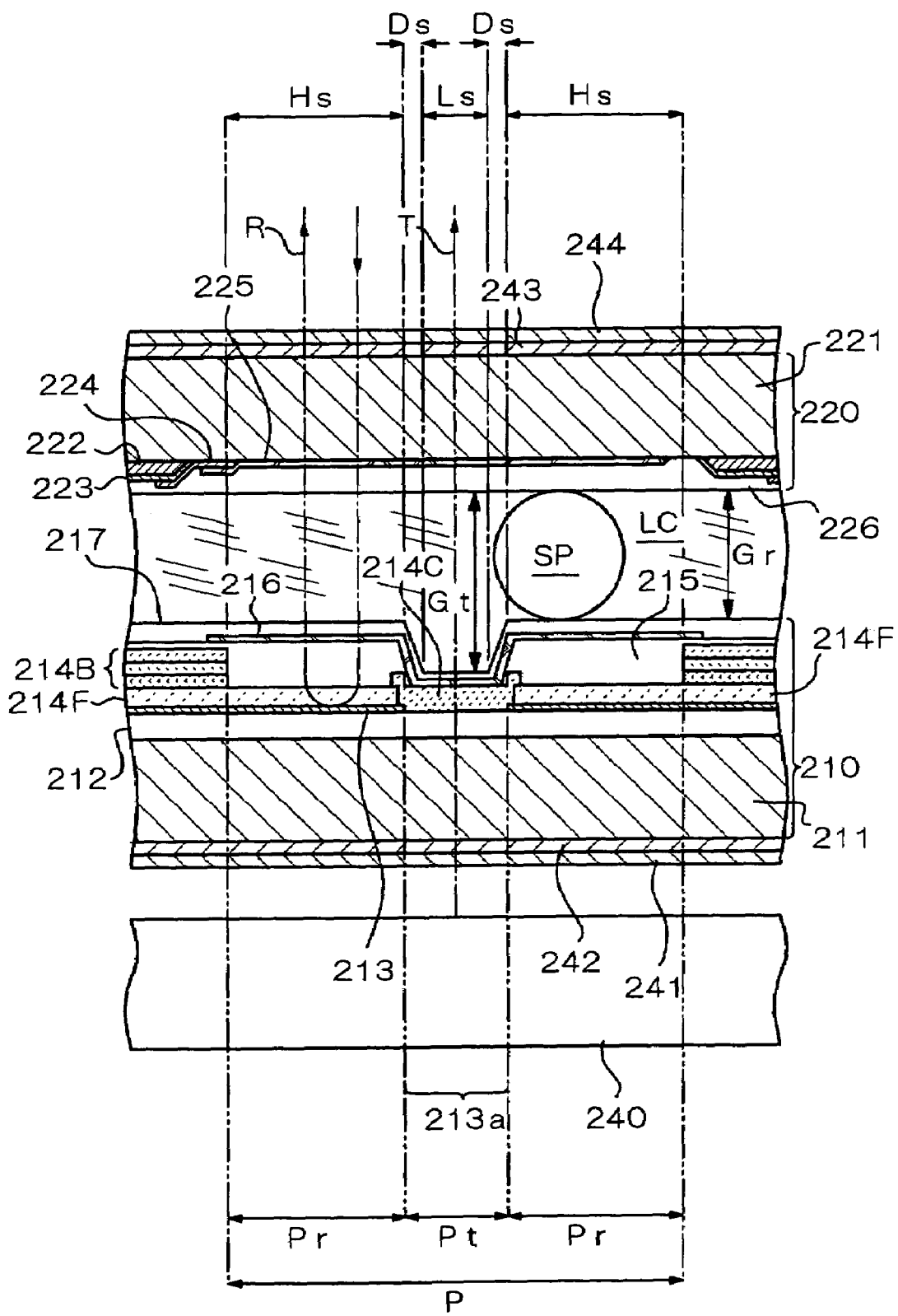
FIG. 2 is a partially enlarged sectional view showing a portion of an electro-optical device.

FIG. 1 is an exploded perspective view of a liquid crystal display 200 as an example of an electro-optical device comprising a color filter substrate according to the present invention, and FIG. 2 is a partially enlarged sectional view showing a liquid crystal display 200. As shown in FIG. 1, the liquid crystal display 200 is configured by joining a substrate (a color filter substrate) 210 and a substrate (a counter substrate or an element substrate) 220 together through a sealing material (not shown), and as shown in FIG. 2, these substrates are spaced apart by a suitable gap of about 3 to 10 µm by regulation according to a spacer SP therebetween, and a liquid crystal LC is encapsulated in a space surrounded by the substrates.

As shown in FIG. 1, an electrode 216 is formed on a base member 211 in the substrate 210. A plurality of electrodes 216 is, for example, arranged in parallel as in the illustrated example. Specifically, a transparent base layer 212 is formed on the base member 211, and a light reflection layer 213 is formed on the base layer 212. An opening 213a is provided in the light reflection layer 213 for every pixel P as illustrated in FIG. 2. In the pixel P, a light transmission portion Pt is provided by the opening 213a and a light reflection portion Pr is provided by the light reflection layer 213.

A first colored layer 214C is formed on the opening 213a, and a second colored layer 214F is formed on the light reflection layer 213. The first colored layer 214C and the second colored layer 214F are made of resin including a colorant such as dye or pigment. The first colored layer 214C and the second colored layer 214F disposed within the same pixel P are tinged with the same kinds of hues, and the first colored layer 214C and the second colored layer 214F tinged with different kinds of hues per pixel P are arranged in the suitable patterns such as a stripe array, a delta array, or an inclined mosaic array. The first colored layer 214C and the second colored layer 214F within any one pixel P have the same kind of a single hue among plural kinds of hues, but the optical film thickness of the first colored layer 214C is configured to be thicker than that of the second colored layer 214F. For example, if a color filter consists of three colors of R (red), G (green), and B (blue), the first colored layer 214C is composed of a filter of a dark color and the second colored layer 214F is composed of a filter of a light color with respect to these three colors respectively.

Also, a light shielding portion 214B is formed in a region between pixels P. The light shielding portion 214B is configured by laminating a plurality of the first colored layers 214C with different colors in the example illustrated. The light shielding portion 214B may be formed in a black matrix layer or a metal layer such as chromium (Cr).

As shown in FIG. 2, on the second colored layer 214F and the light shielding portion 214B, a transparent protective film 215 is formed. The protective film 215 is usually formed to protect each colored layer of a color filter and also to flatten a surface. In this embodiment as well, the protective film 215 is formed not only for the sake of such function but also as an element for providing a step difference on a surface of the substrate 210. That is, the protective film 215 is not formed on the first colored layer 214C but selectively formed on the second colored layer 214F and the light shielding portion 214B.

By the selective formation of the protective film 215, a pixel P comprises a first region Ls having a lower relative surface and a second region Hs having a higher relative surface, wherein there exists a prescribed height difference between the first region Ls and the second region Hs, and a step difference region Ds is provided between the first region Ls and the second region Hs. The step difference region Ds is the region where a step difference plane configured by the presence or absence of the protective film 215 is formed.

Moreover, in the embodiment, the protective film 215 is not formed in the first region Ls at all but the protective film 215 is formed in the second region Hs. However, generally, the first region Ls having a lower surface and the second region Hs having a higher surface should be provided via the step difference region Ds having a step difference plane. Therefore, for example, it would be acceptable if a thin protective film 215 is formed in the first region Ls and a thick protective film 215 is formed in the second region Hs. That is, generally, the first region Ls and the second region Hs are not defined by a specific structure such as the presence or absence of the protective film 215 or its difference in thickness, but consequently a height difference should be provided between surfaces.

In the present embodiment, a transparent electrode 216 made of a transparent conductor such as ITO is formed on the first colored layer 214C and the protective film 215. The transparent conductor 216 is integrally formed as one from the first colored layer 214C via the step difference region Ds (the step difference plane) to the second colored layer 214F (and the protective film 215). The alignment film 217 is formed on the transparent electrode 216.

Meanwhile, in a substrate 220, a wire 222 made of a metal such as tantalum (Ta) is formed on a base member 221 made of glass or plastic. On the wire 222, a diode element is formed in every pixel, and the diode element is connected to the electrode 225. Specifically, a counter terminal 224 made of Cr, etc. is joined through an insulating film 223 (see FIG. 2) such as $Ta_2O_5$ formed on the wire 222, and the counter terminal 224 is connected to the electrode 225 made of ITO, etc. The above-mentioned diode element is formed of an MIM (metal-insulator-metal) structure of the wire 222, the insulating film 223, and the counter terminal 224. The diode element of the MIM structure is disposed to overlap, in plan view, a region between pixels where the light shielding portion 214B is disposed. On these structures, the same alignment film 226 as described above is formed.

Furthermore, in the process of manufacturing the substrate 210 and 220, an electrode or a wire can be formed by the sputtering method. Also, the insulating film 223 of the MIM element can be formed by oxidizing the surface of the wire 222 such as the anodic oxidation method. The color filter 214 can be formed by applying the colored photoresist such as the roll coating method and repeating the photolithography, etc., which performs exposure and development for every color.

As shown in FIG. 2, a backlight 240 is disposed at the rear of a panel structure of the liquid crystal display 200. Also, a polarizer 241 and a retardation film 242 are sequentially arranged between the panel structure and the backlight 240, and the retardation film 243 and the polarizer 244 are sequentially arranged at the front of the panel structure as well. Also, the liquid crystal display 200 as illustrated shows that a liquid crystal layer of STN mode is configured by the above-mentioned liquid crystal LC.

In this embodiment, a transmissive display is performed by a transmitted light component T passing through the light transmission portion Pt, i.e., the opening 213a of the light reflection layer 213, among the light irradiated from the backlight 240. Also, a reflective display is performed by a reflected light component R which is reflected by the light reflection layer 213 in the light reflection portion Pr following the external light incident on the panel. In this case, the transmitted light component T composing the transmissive display basically passes through the first colored layer 214C only once, and the reflected light component R composing the reflective display basically passes through the second colored layer 214F twice. Therefore, it is possible to greatly improve the display quality of the transmissive display and the reflective display by forming the first colored layer 214C and the second colored layer 214F in the optimal optical characteristics.

Moreover, in this embodiment, since there exists a difference in height between the first region Ls and the second region Hs, a liquid crystal layer with a different thickness can be provided within a pixel P depending on the height difference. That is, a liquid crystal layer thickness Gt is thick in the first region Ls and a liquid crystal layer thickness Gr is thin in the second region Hs. As such, since it is possible to approach a retardation value of a liquid crystal layer with respect to the transmitted light component T passing through a liquid crystal layer only once to a retardation value of a liquid crystal layer with respect to the reflected light component R passing through a liquid crystal layer twice, it is possible to improve the display quality of both the transmissive display and the reflective display. Specifically, it is possible to improve the brightness of both displays.

Figure 3:
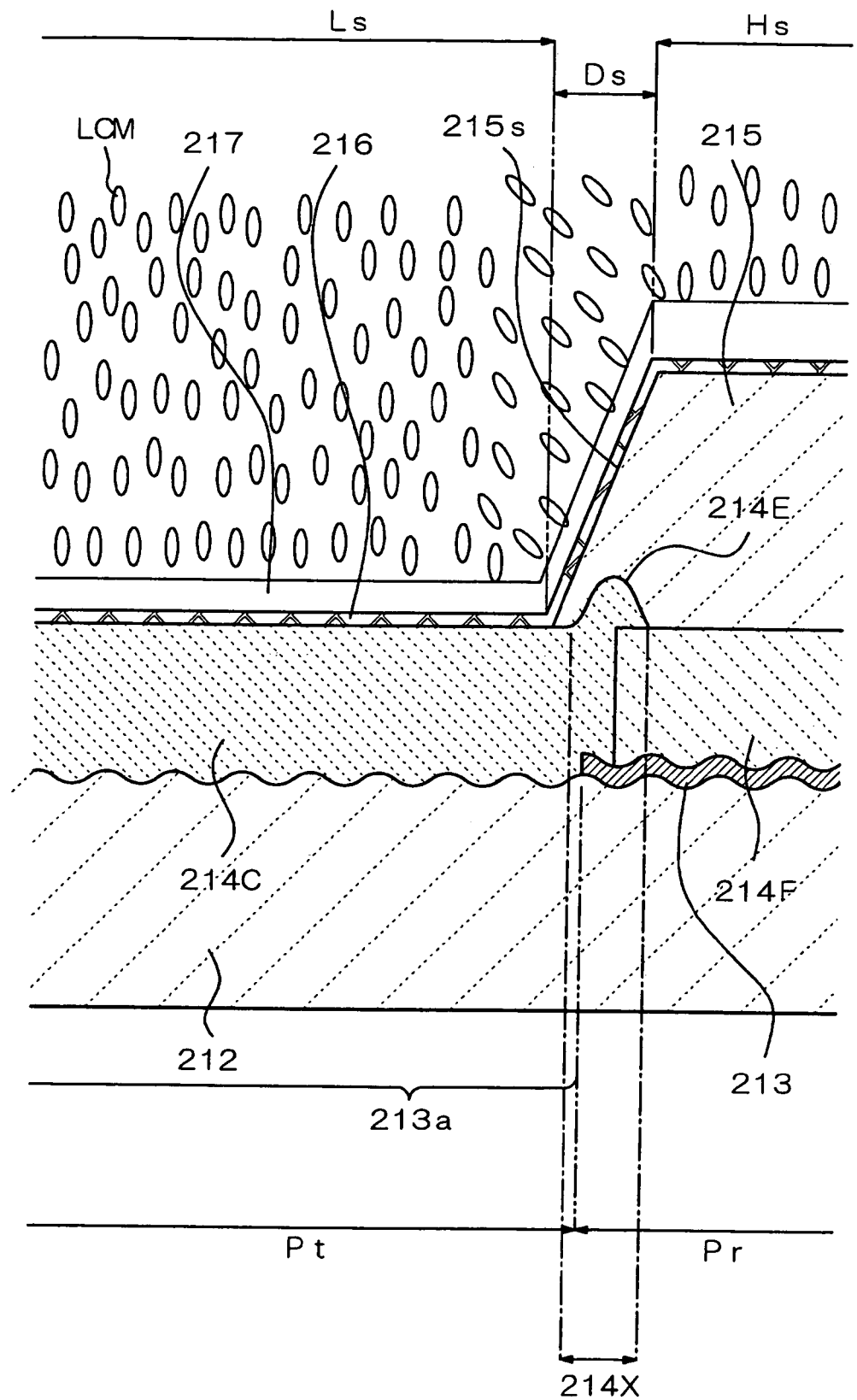
FIG. 3 is a partially enlarged sectional view showing a portion of a pixel of an electro-optical device.

FIG. 3 is an enlarged sectional view showing a portion of a pixel P in the liquid crystal display 200 on the side of the substrate 210. The first colored layer 214C and the second colored layer 214F are disposed adjacent to each other, and an interface portion 214X of both colored layers is disposed in a region toward the second region Hs from the bottom portion of a step difference plane 215s defining a boundary line of the first region Ls side in the step difference region Ds. In case of the illustrated example, the first colored layer 214C and the second colored layer 214F overlap each other in the interface portion 214X, resulting in formation of a protrusion 214E. Also, the protrusion 214E is disposed in a region toward the second region Hs from the step difference plane 215s. Specifically, the entire protrusion 214E is disposed within the step difference region Ds.

Unlike the illustrated example, there may be an occasion wherein the interface portion 214X is disposed in close proximity to the bottom of the step difference plane 215s so that a lower shape of the step difference plane 215s is partially transformed by the protrusion 214E and a step is formed in the bottom portion of the step difference plane 215s. However, even though such step is formed, the step formed by the protrusion 114E and the step difference plane should be separated and a recessed portion should not be formed on the second region side of the corresponding step as shown in FIG. 10.

Figure 10:
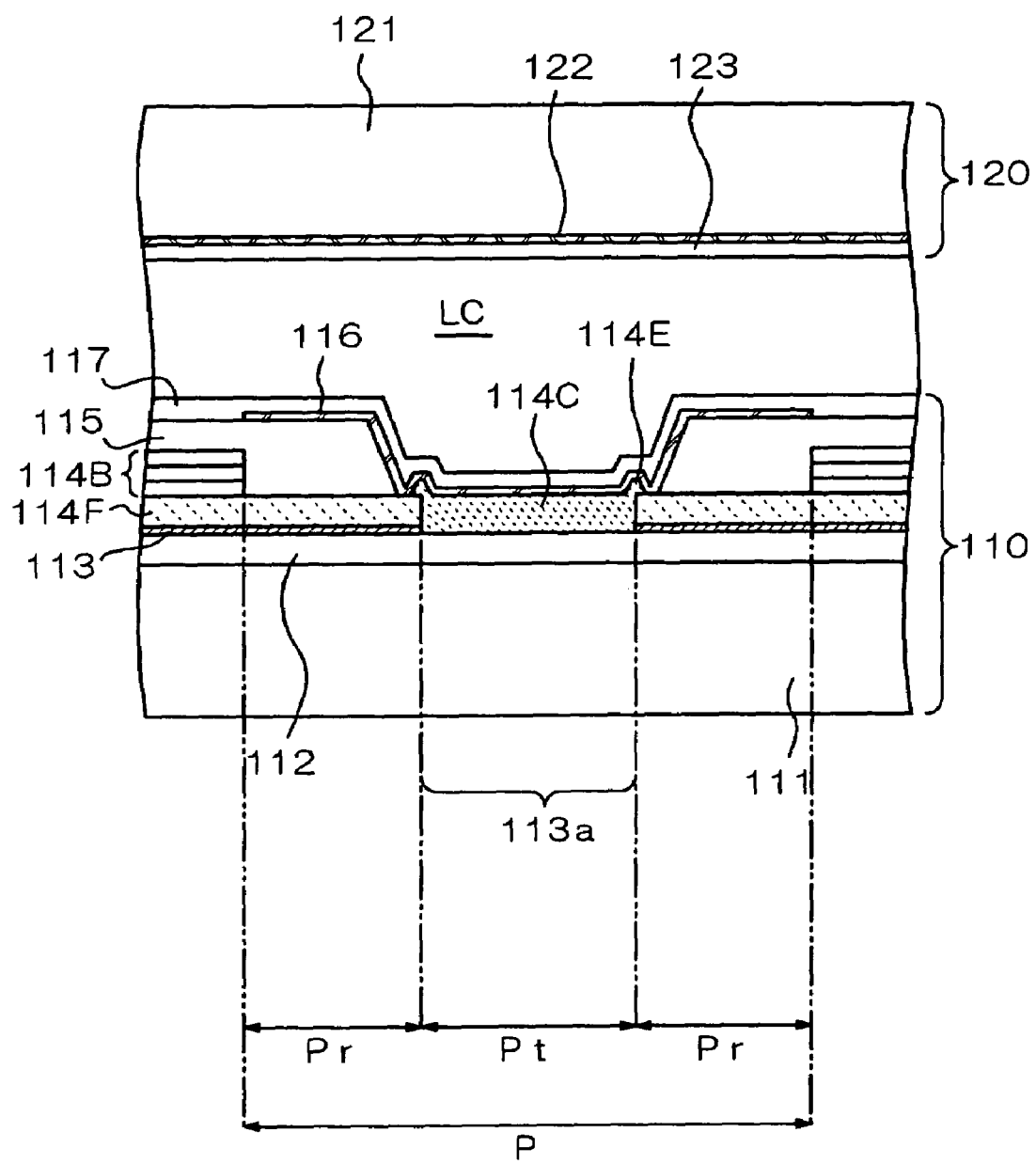
FIG. 10 is a partially enlarged sectional view showing a structure susceptible to defects in a liquid crystal panel.

In this embodiment, the interface portion 214X of the first colored layer 214C and the second colored layer 214F is disposed in a region toward the second region Hs from the bottom portion of the step difference plane 215s (i.e., a boundary of the first region Ls side of the step difference region Ds), so that it is difficult for a minute uneven structure to be formed on the first region Ls side rather than the step difference plane 215s by the protrusion 114E as shown in FIG. 10. In this regard, it is possible to suppress the occurrence of an optical or an electrical defect due to the uneven structure. Especially, since a recessed portion, as shown in FIG. 10, will not be formed between the protrusion 114E and the step difference plane, a problem caused by the recessed portion does not occur.

For example, if there exists any minute uneven structure or any recessed portion as shown in FIG. 10, a display quality deteriorates since an alignment state of the liquid crystal generated by the alignment film 117 formed thereon is scattered. Especially, if the above-mentioned minute uneven structure or the recessed portion is disposed in the light transmission portion Pt, there is a possibility to greatly deteriorate the display quality of the transmissive display. Also, by forming the transparent electrode 216 on the minute uneven structure or the recessed portion, there is a possibility that the transparent electrode 216 will be made partially thin or torn.

On this account, there is also a possibility that an electric field application condition by the transparent electrode 216 will deteriorate. Especially, if a thin portion or a torn portion is formed in the vicinity of the interface portion between the light transmission portion Pt and the light reflection portion Pr, the applied voltage within the light transmission portion Pt decreases.

In this regard, in case of this embodiment, since the interface portion 214X of both colored layers is disposed within the step difference region Ds or the second region Hs, even though the protrusion 214E may be within the interface portion 214X, the unevenness caused by the protrusion 214E is absorbed by the step difference of the step difference plane in the step difference region Ds or the height of the second region Hs. Therefore, the minute uneven structure or the recessed portion does not appear on a surface, or even though it appears, the height difference of the uneven structure is extremely small. Hence, it is possible to prevent or reduce the occurrence of the above-mentioned optical or electrical defects.

Meanwhile, there is an occasion wherein the step difference region Ds where the step difference plane 215s is formed usually becomes the cause of a light leak when a pixel P is in a black display (a light blocking state). Such occasion owes to an alignment state of a liquid crystal molecule LCM in the step difference region Ds being scattered by the inclination of the step difference plane 215s such that the liquid crystal molecule LCM in the step difference region Ds is oriented in the inclined direction as shown in the example, under the assumption that the liquid crystal molecule LCM of the first region Ls or the second region Hs is vertically arranged in case of the black display as shown schematically in FIG. 3. Therefore, when the interface portion 214X is disposed within the step difference region Ds as in this embodiment, it is possible to suppress the above-mentioned light leak since the light transmittance ratio is reduced even slightly due to the overlapping of the first colored layer 214C and the second colored layer 214F in the interface portion 214X.

Furthermore, in the above-mentioned structure, the interface portion of the light transmission portion Pt and the light reflection portion Pr is preferably within or in the vicinity of the interface portion 214X. However, the light reflection layer 213 preferably overlaps the step difference region Ds in order to further reduce the above-mentioned light leak. That is, the position of the opening edge of the light reflection layer 213 is preferably adjusted to the interface portion between the first region Ls and the step difference region Ds, or extends slightly into the first region Ls. Such configuration is based on the fact that it is usually assumed that the light leak has a greater effect on the transmissive display provided by the light transmitted through the restricted opening 213a than on the reflective display. For example, since the transmissive display is formed almost only by the transmitted light component passing through the opening 213a (i.e., the light transmission portion Pt) among the light from the backlight 240, while the reflective display is influenced not only by the light reflection portion Pr but also the reflected light component from the light transmission portion Pt, it is considered that it is more difficult for the light leak to be conspicuous in the reflective display than in the transmissive display.

Also, since the step difference region Ds is generally 5 to 10 μm wide, e.g., about 8 μm, and the interface portion 214X is 2 to 6 μm wide, e.g., about 4 μm, it is not difficult to dispose the interface portion 214X within the step difference region Ds. Also, the step difference plane 215s appears to be considerably steep in FIG. 2, but, in fact, when the protective film 15 is, for example, approximately 2 μm thick, the step difference plane is approximately 8 μm wide. Thus, the angle of inclination of the step difference plane 215s is actually quite gentle.

Figure 4:
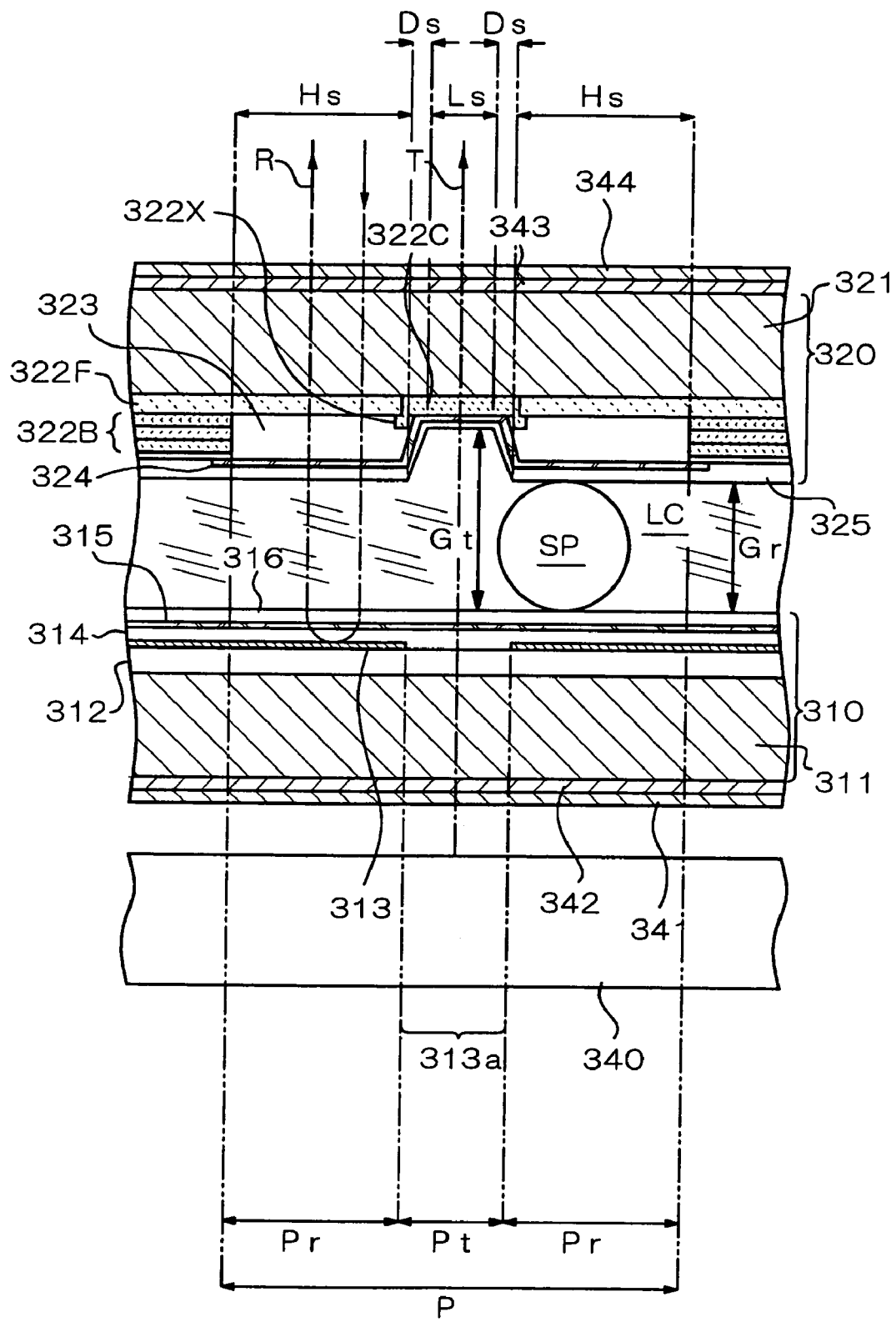
FIG. 4 is a partially enlarged sectional view showing an electro-optical device having a different configuration.

FIG. 4 is a partially enlarged sectional view showing a configuration example of a color filter substrate and an electro-optical device different from the above-mentioned embodiment. The liquid crystal display 300 of this configuration example is a passive matrix liquid crystal display, and a substrate 310 comprises a light reflection layer 313 and a substrate 320 comprises a color filter. Therefore, it is different from the above-mentioned embodiment in that the substrate (a color filter substrate) 320 does not comprise a light reflection layer.

In the substrate 310 of the liquid crystal display 300, a base layer 312, a light reflection layer 313, an insulation layer 314, a transparent electrode 315, and an alignment film 316 are sequentially formed on a base member 311. Also, in the substrate 320, a first colored layer 322C and a second colored layer 322F are formed on a base member 321, and a region between pixels comprises a light shielding portion 322B. Also, similarly to the above-mentioned embodiment, a protective film 323 with a step difference plane is provided and a transparent electrode 324 is formed on the protective film 323. Also, these are covered with an alignment film 325.

In addition, a backlight 340, a polarizer 341, retardation films 342, 343, a polarizer 344, a liquid crystal layer LC, and a spacer SP are identical to the above-mentioned embodiment.

Also, in this configuration example, similarly to the above-mentioned embodiment, a transmissive display can be made by the transmitted light component T of the light irradiated from the backlight 340, and a reflective display can be made by the reflected light component R of an external light. Also, it has been contrived to improve a display quality of both a transmissive display and a reflective display by the difference between a thickness Gt of a liquid crystal layer corresponding to a first region Ls and a thickness Gr of a liquid crystal layer corresponding to a second region Hs. In this configuration example, a light reflection layer is not formed on the substrate 320 which is a color filter substrate; but similarly to the above-mentioned embodiments, since an interface portion (a protrusion) 322X between a first colored layer 322C and a second colored layer 322F is basically disposed within a step difference region Ds or a second region Hs, an effect reducing an optical or electrical defect is obtained.

Method of Manufacturing a Color Filter Substrate

Figure 5A:
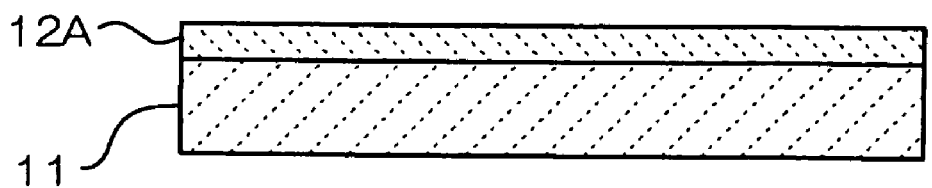
FIGS. 5(a) to 5(c) are sectional views showing a process of manufacturing a color filter substrate.
Figure 5B:
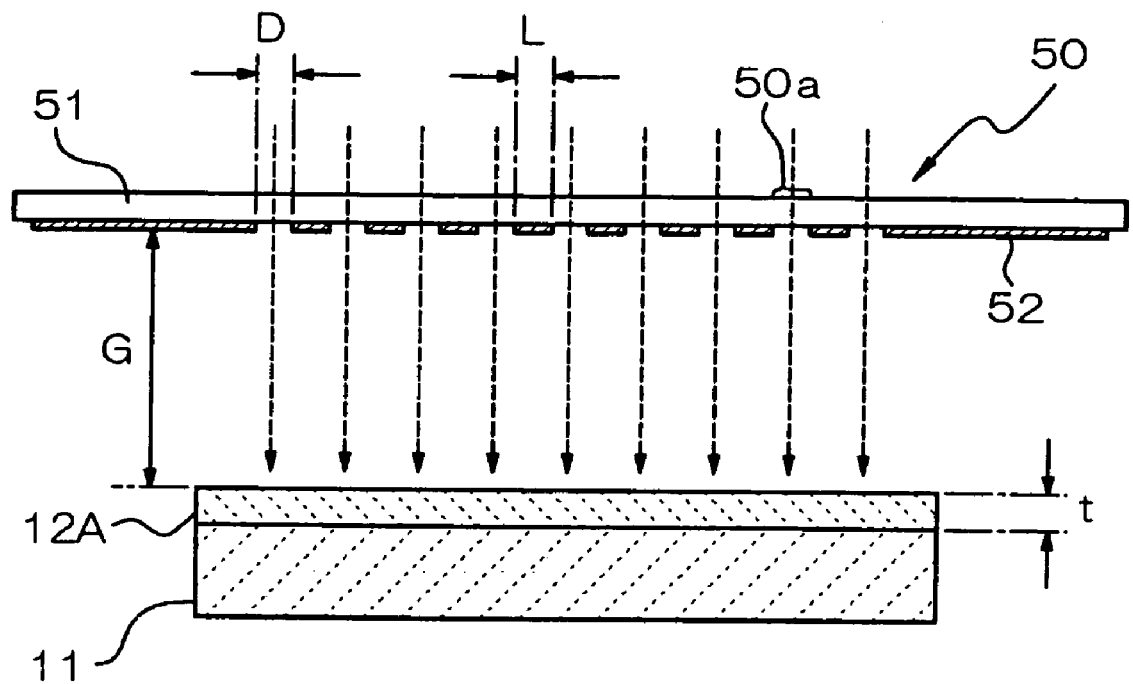

Reference will now be made to a method of manufacturing a color filter substrate with reference to FIGS. 5 to 7. First, as shown in FIG. 5(a), a photosensitive resin 12A is disposed on a surface of a base member 11 made of glass, plastic, etc., by a spin coating method, a roll coating method, a screen printing method, etc. As an example of this photosensitive resin 12A, a positive photoresist such as novolak resin is available. Next, as shown in FIG. 5(b), a proximity exposure is performed on the photosensitive resin 12A using an exposure mask 50. As the exposure mask 50, an element forming a light shielding portion 52 consisting of a metal thin film, etc., on a surface of a transparent base member 51 such as glass is available. An opening diameter D of an optical aperture 50a, a mean interval L, and an exposure gap (a proximity gap) G, etc., of the exposure mask 50 are properly determined considering the light scattering property of the light reflection layer which will be described later. Also, the thickness t of the photosensitive resin 12A is usually about 1.0 to 3.0 μm.

Figure 5C:
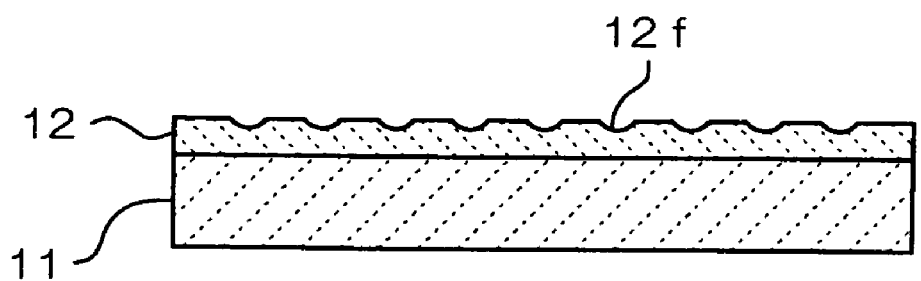
Figure 6D:
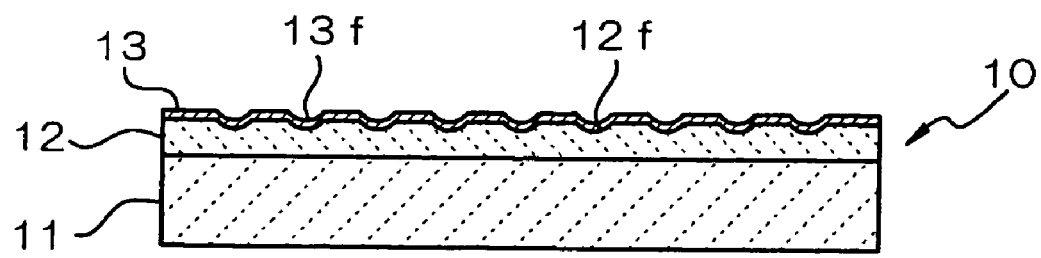
FIGS. 6(d) to 6(g) are sectional views showing a process of manufacturing a color filter substrate.
Figure 6E:
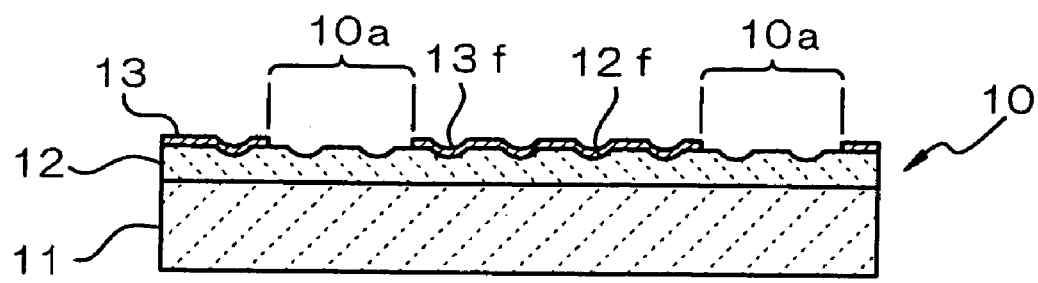

Next, by developing the photosensitive resin exposed as described above, a base layer 12 having a recessed surface 12f is formed as shown in FIG. 5(c). As shown in FIG. 6(d), a light reflection layer 13 is formed on the base layer 12 by depositing Al, Ag, Cr, or alloy mainly composed of these metals by a vapor deposition method or a sputtering method. Then, as shown in FIG. 6(e), an opening is formed on the light reflection layer 13, and a light transmission portion 10a is formed on the color filter substrate 10 by performing etching with an etching mask.

Figure 6F:
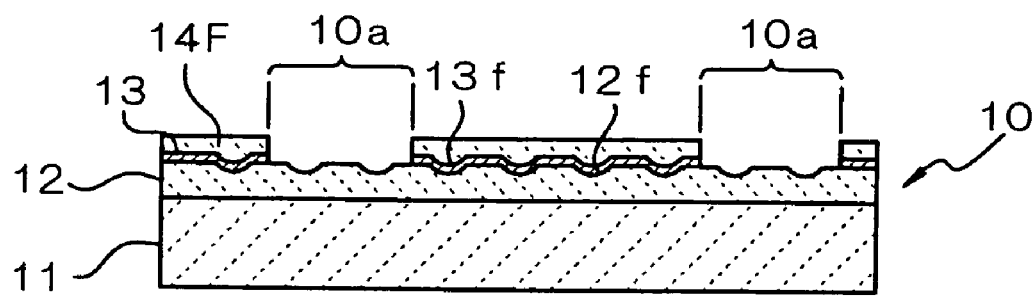

Next, as shown in FIG. 6(f), a second colored layer 14F is formed on the light reflection layer 13 by a photolithography, etc. The second colored layer 14F is configured by properly adding colorant such as dye or pigment to its base such as acrylic resin. The second colored layer 14F is formed in a region where the light reflection layer 13 is formed, but is not formed in the light transmission portion 10a by performing a patterning process, etc. In this case, in a process of forming the second colored layer 14F, the forming process is usually repeatedly performed for plural kinds of layers having different colors (e.g., R (red), G (green), B (blue)), and the plural kinds of hues are configured to become a prescribed array.

Figure 6G:
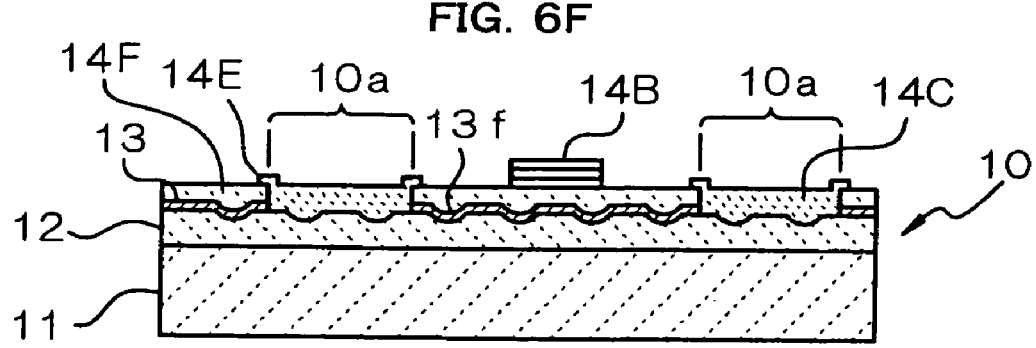

Next, as shown in FIG. 6(g), a first colored layer 14C is formed in the light transmission portion 10a. The first colored layer 14C is basically made of the same materials as the second colored layer 14F, but, for example, the adding quantity of the above-mentioned colorant is set to be more than the adding quantity in the material of the second colored layer 14F. As such, the first colored layer 14C is, as an optical filter, thicker than the second colored layer 14F in an optical film thickness. As the first colored layer 14C, similarly to the second colored layer 14F, the layer with plural kinds of hues is configured to become a prescribed array. Moreover, a light shielding portion 14B is formed on the second colored layer 14F. In the illustrated example, the first colored layer 14C having a plurality of hues is laminated to form the light shielding portion 14B. However, the light shielding portion 14B may be made of a black resin or a thin metal film.

The first colored layer 14C is formed to be disposed adjacent to the second colored layer 14F, particularly is preferably formed to slightly overlap the edge of the second colored layer 14F. As such, the same protrusion 14E as the above-mentioned protrusion 214E is formed, but it is possible to prevent a gap from occurring between the first colored layer 14C and the second colored layer 14F. Also, the interface portion between the first colored layer 14C and the second colored layer 14F is configured to nearly coincide with the opening edge of the light reflection layer 13, but the corresponding interface portion is preferably configured to be disposed not within the opening 13a but on the light reflection layer 13 (the opening edge thereof).

Figure 7H:
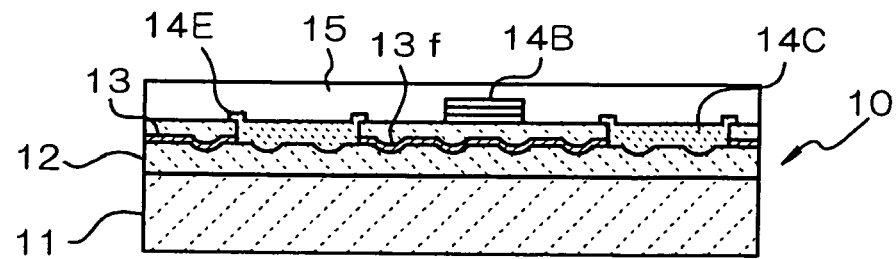
FIGS. 7(h) to 7(k) are sectional views showing a process of manufacturing a color filter substrate.
Figure 7I:
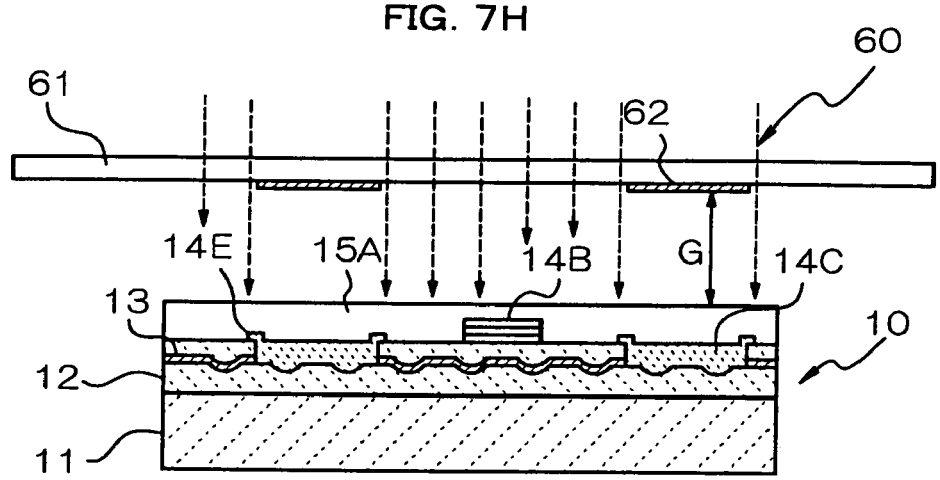
Figure 7J:
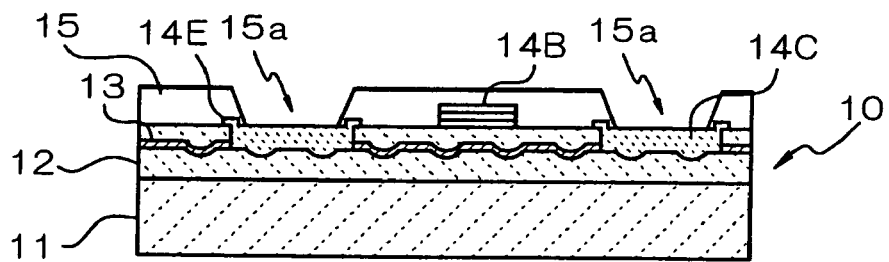

Next, as shown in FIG. 7(h), a transparent protective film 15 is formed on the respective colored layers by a spin coating method, a screen printing method, etc. In this embodiment, the protective film 15 is made of a negative photoresist. As shown in FIG. 7(i), the proximity exposure is performed on the protective film 15. In this exposure process, the portion over the first colored layer 14C is shaded and light is irradiated to the rest using the exposure mask 60. As the exposure mask 60, similarly to the exposure mask 50, an element forming the light shielding layer 62 on the transparent base member 61 is available. Then, as shown in FIG. 7(j), an opening 15a is formed in a region on the first colored layer 14C by performing a development process.

In the above-mentioned exposure process, it is possible to control the exposure quantity of the protective film 15 or the exposure quantity of the interface portion between the light shielding region and the exposure region by adjusting the size of the light shielding region (the exposure region) or the exposure gap G, and by this control, it is possible to adjust the position of the opening edge of the opening 15a or the angle of inclination of a step difference plane formed the opening edge. Since the later-mentioned transparent electrode is usually formed on the opening edge of the protective film 15 as well, the step difference plane corresponding to the opening edge of the opening 15a of the protective film 15 is, as described above, formed as a plane inclined to a certain degree in order to avoid a problem such as a tear of the transparent electrode.

Also, in the exposure process, the position of the opening edge (i.e., the bottom portion of the step difference plane) of the opening 15a is formed to be disposed in a region toward the first colored layer 14C from the interface portion (protrusion 14E) between the first colored layer 14C and the second colored layer 14F.

Figure 7K:
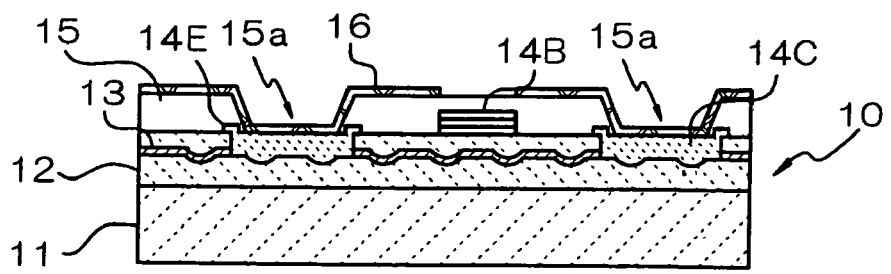

Finally, as shown in FIG. 7(k), a transparent electrode 16 is formed by depositing a transparent conductor such as ITO on the protective film 15 and the opening 15a by the sputtering method, etc., and by performing the patterning process such as the etching. As such, the color filter substrate 10 having the same structure as the substrate 210 shown in FIG. 2 is formed.

Electronic Apparatus

Figure 8:
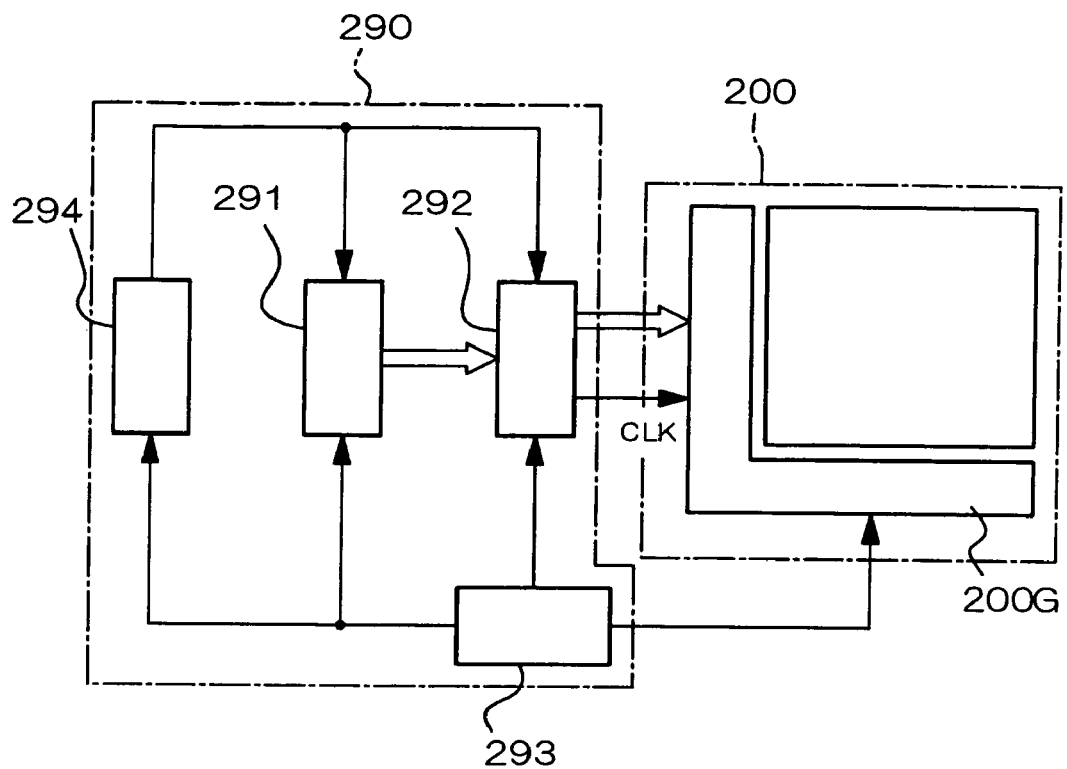
FIG. 8 is a schematic block diagram showing a control system of an electronic apparatus.

Finally, reference will be made to an embodiment of the electronic apparatus according to the present invention with reference to FIGS. 8 and 9. The electronic apparatus comprising the liquid crystal display 200 of the electro-optical device as display means will be set forth in this embodiment. FIG. 8 is a schematic diagram showing the entire configuration of the control system (display control system) for the liquid crystal display 200 in the electronic apparatus according to this embodiment. This electronic apparatus comprises a display control circuit 290 comprising a display information output source 291, a display information processing circuit 292, a power supply circuit 293, and a timing generator 294. Also, the same liquid crystal display 200 as the above-mentioned liquid crystal display comprises a driving circuit 200G driving the display region. The driving circuit 200G usually comprises a semiconductor IC chip directly mounted on a liquid crystal panel, a circuit pattern formed on a panel surface, or a semiconductor IC chip mounted on a circuit board electrically connected to the liquid crystal panel or a circuit pattern.

The display information output source 291 comprises a memory consisting of ROM (Read Only Memory), RAM (Random Access Memory), etc., a storage unit consisting of a magnetic recording disk, an optical recording disk, etc., and a tuning circuit for tuning and outputting a digital image signal, and is configured to supply display information to the display information processing circuit 292 in the form of a prescribed format of image signals, etc., based on various clock signals generated by the timing generator 294.

The display information processing circuit 292 comprises widely-known various circuits such as a serial-parallel converting circuit, an amplifying/inverting circuit, a rotation circuit, a gamma correcting circuit, a clamping circuit, etc., and performs the processing of the display information inputted so as to supply the image information to the driving circuit 200G together with clock signals CLK. The driving circuit 200G includes a scanning line driving circuit, a signal line driving circuit, and a test circuit. Also, the power supply circuit 293 supplies a prescribed voltage to the above-mentioned components respectively.

Figure 9:
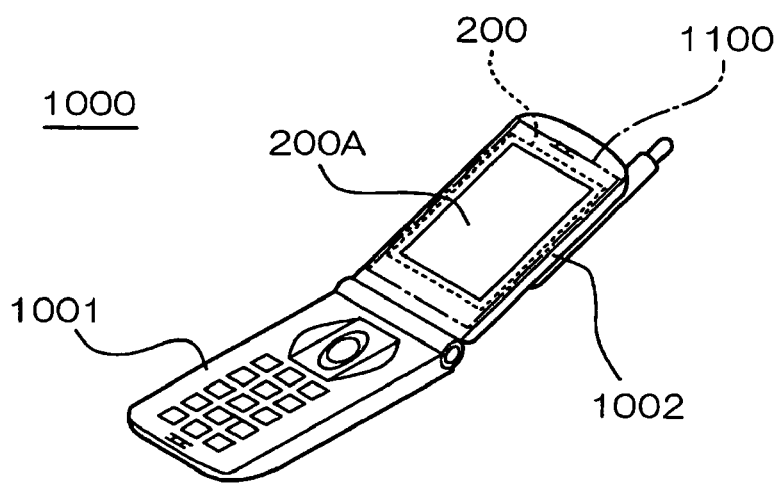
FIG. 9 is a schematic perspective view showing a configuration example of an electronic apparatus.

FIG. 9 shows a cellular phone as an embodiment of the electronic apparatus according to the present invention. The cellular phone 1000 comprises an operation unit 1001 and a display unit 1002. A plurality of operation buttons is arranged on the front of the operation unit 1001 and a microphone is built inside a sending unit. Also, a speaker is built inside the receiving unit of the display unit 1002.

In the display unit 1002, the circuit board 1100 is installed inside the case and the above-mentioned liquid crystal display 200 is mounted on the circuit board 1100. The liquid crystal display 200 installed in the case is configured to view the display plane through the display window 200A.

In addition, the present invention is not be limited to the foregoing embodiments, and many alternatives, modification, and variations are possible without departing from the scope of the present invention. For example, the liquid crystal display 200 as an example of an electro-optical device was set forth in the above-mentioned embodiments, but the present invention is not limited to a liquid crystal display but applied to various types of electro-optical devices such as an organic electro luminescent device, a plasma display, and a field emission display, etc. Moreover, the light reflection substrate is available not only in electro-optical devices but also in various kinds of displays and other types of apparatuses.

The entire disclosure of Japanese Patent Application No. 2002-358381 filed Dec. 10, 2002 is incorporated by reference.

What is claimed is:

1. A color filter substrate comprising:
   a substrate;
   a first colored layer disposed in a first region of the substrate; and
   a second colored layer disposed in a second region of the substrate;
   wherein the first colored layer and the second colored layer are disposed adjacent to each other and have the same hue as each other, one of the first colored layer and the second colored layer being darker than the other;
   a surface of the second region where the second colored layer is disposed is higher than a surface of the first region where the first colored layer is disposed, and a step difference plane is provided between the first region and the second region; and
   an interface portion between the first colored layer and the second colored layer is disposed in a region closer toward the second region than is the bottom portion of the step difference plane, and the interface portion overlapping with the step difference plane, and the first colored layer and the second colored layer overlapping each other at the interface portion.

2. A color filter substrate according to claim 1,
   wherein a protrusion is provided on a surface of the interface portion by overlapping the first colored layer and the second colored layer, and the protrusion is disposed in a region toward the second region from the bottom portion of the step difference plane.

3. A color filter substrate according to claim 1,
   wherein the step difference plane is inclined and at least a portion of the interface portion is disposed in a region overlapping the step difference plane in plan view.

4. A color filter substrate according to claim 1,
   further comprising a light transmission portion disposed in the first region and a light reflection portion having a light reflection layer disposed in the second region.

5. A color filter substrate according to claim 4,
   wherein the light reflection portion includes the interface portion.

6. A color filter substrate according to claim 1,
   further comprising an electrode integrally formed on a surface extending from the first region to the second region by way of the step difference plane.

7. An electro-optical device comprising:
   an electro-optical material;
   an electric field applying means for applying an electric field to the electro-optical material; and
   a color filter substrate according to claim 1.

8. An electro-optical device according to claim 7,
   wherein the electro-optical material is a liquid crystal layer having a first thickness in the first region and a second thickness in the second region that is less than the first thickness, a difference between the first thickness and the second thickness corresponding to the height difference between the first region and the second region.

9. An electronic apparatus comprising an electro-optical device according to claim 7 and a controller for controlling the electric field.

10. A method of manufacturing a color filter substrate comprising:
    disposing a first colored layer in a first region;
    disposing a second colored layer in a second region, the first and second colored layers having the same hue as each other, one of the first colored layer and the second layer being darker than the other; and
    forming a step difference where a surface of the second region where the second colored layer is disposed is formed to be higher than a surface of the first region where the first colored layer is disposed via a step difference plane between the first region and the second region;
    wherein, in the step of forming the step difference, the bottom portion of the step difference plane is formed in a region toward the first colored layer from an interface portion between the first colored layer and the second colored layer, and the interface portion overlapping with the step difference plane, and the first colored layer and the second colored layer overlapping each other at the interface portion.

11. A method of manufacturing a color filter substrate according to claim 10,
    wherein the first colored layer and the second colored layer are formed to overlap each other on the interface portion.

12. A method of manufacturing a color filter substrate according to claim 10, wherein the step difference plane is formed as an inclined plane in a region overlapping at least a portion of the interface portion in plan view.

13. A method of manufacturing a color filter substrate according to claim 10,
    further comprising forming a light reflection layer having an opening in the first region,
    the light reflection layer covering the interface portion in plan view.

14. A method of manufacturing an electro-optical device comprising:
    disposing a first colored layer in a first region on a substrate to be arranged along an electro-optical material;
    disposing a second colored layer in a second region on the substrate to be arranged along the electro-optical material, the first and second colored layers having the same hue as each other, one of the first colored layer and the second colored layer being darker than the other; and
    forming a step difference where a surface of the second region where the second colored layer is disposed is formed to be higher than a surface of the first region where the first colored layer is disposed via a step difference plane between the first region and the second region;
    wherein, in the step of forming the step difference, the bottom portion of the step difference plane is formed in a region closer toward the first colored layer from an interface portion between the first colored layer and the second colored layer, and the interface portion overlapping with the step difference plane, and the first colored layer and the second colored layer overlapping each other at the interface portion.

15. A method of manufacturing an electro-optical device according to claim 14,
    wherein the first colored layer and the second colored layer are formed to overlap each other in the interface portion.

* * * * *